(12) United States Patent
Jha et al.

(10) Patent No.: US 7,770,785 B2
(45) Date of Patent: Aug. 10, 2010

(54) APPARATUS AND METHODS FOR DETECTION AND MANAGEMENT OF UNAUTHORIZED EXECUTABLE INSTRUCTIONS ON A WIRELESS DEVICE

(75) Inventors: Sanjay K. Jha, San Diego, CA (US); Behrooz L. Abdi, Carlsbad, CA (US); Clifton Eugene Scott, San Diego, CA (US); Kenny Fok, San Diego, CA (US); Tia Manning Cassett, San Diego, CA (US); Jihyun Hwang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 942 days.

(21) Appl. No.: 11/435,049

(22) Filed: May 15, 2006

(65) Prior Publication Data

US 2006/0278694 A1 Dec. 14, 2006

Related U.S. Application Data

(60) Provisional application No. 60/690,222, filed on Jun. 13, 2005.

(51) Int. Cl.
*G06Q 40/00* (2006.01)
*G07D 11/00* (2006.01)
*G07F 19/00* (2006.01)
(52) U.S. Cl. .................. 235/379; 235/472.02
(58) Field of Classification Search ............ 235/379, 235/375, 487, 383, 472.02; 705/7–8
See application file for complete search history.

(56) References Cited

U.S. PATENT DOCUMENTS

| 5,970,227 | A | 10/1999 | Dayan et al. | |
| 2001/0049263 | A1 | 12/2001 | Zhang | |
| 2003/0099358 | A1 | 5/2003 | Michael et al. | |
| 2004/0064351 | A1* | 4/2004 | Mikurak | 705/7 |
| 2004/0193917 | A1 | 9/2004 | Drews | |

FOREIGN PATENT DOCUMENTS

TW 200408249 5/2004

OTHER PUBLICATIONS

International Search Report & Written Opinion-PCT/US2006/022057, International Search Authority - European Patent Office - Apr. 25, 2008.

* cited by examiner

*Primary Examiner*—Edwyn Labaze
(74) *Attorney, Agent, or Firm*—Sandip S. Minhas; Won Tae C. Kim

(57) ABSTRACT

Detection and management methods and apparatus for wireless devices may include an executable instruction authorization module operable to scan executable instructions on a wireless device, generate a log indicative of a virus or otherwise unauthorized executable instructions based on a received authorization configuration, and forward the log to a user manager. The user manager may be operable to analyze the log and generate an authorization report which may be viewable by an operator to determine the disposition of unauthorized executable instructions. At least one of the executable instruction authorization module, the user manager, and the operator may be operable to generate a control command operable to delete, or otherwise disable, unauthorized executable instructions on the wireless device, or to restore the executable instructions on the wireless device.

52 Claims, 9 Drawing Sheets

APPARATUS AND METHODS FOR DETECTION AND MANAGEMENT OF UNAUTHORIZED EXECUTABLE INSTRUCTIONS ON A WIRELESS DEVICE

CLAIM OF PRIORITY UNDER 35 U.S.C. §119

The present Application for Patent claims priority to Provisional Application No. 60/690,222 entitled "Methods and Apparatus for Scanning Virus in a Wireless Device," filed Jun. 13, 2005, assigned to the assignee hereof and hereby expressly incorporated by reference herein.

BACKGROUND

The described embodiments generally relate to wireless communication devices and computer networks. More particularly, the described embodiments relate to the detection and disposition of unauthorized executable instructions on a wireless device.

Wireless networking connects one or more wireless devices to other computer devices without a direct electrical connection, such as a copper wire or optical cable. Wireless devices communicate data, typically in the form of packets, across a wireless or partially wireless computer network and open a "data" or "communication" channel on the network such that the device can send and receive data packets. The wireless devices often have wireless device resources, such as programs and hardware components, which individually and cooperatively operate to use and generate data in accordance to their design and specific protocol or configuration, such as using open communication connections to transmit and receive data on the network.

Wireless devices are being manufactured with increased computing capabilities and are becoming tantamount to personal computers. These "smart" wireless devices, such as cellular telephones, have application programming interfaces ("APIs") installed onto their local computer platform that allow software developers to create software applications that operate on the cellular telephone. The API sits between the wireless device system software and the software application, making the cellular telephone functionality available to the application without requiring the software developer to have the specific cellular telephone system source code.

In one aspect, the integrity of the wireless device may be compromised by either the intended or non-intended downloading of certain executable instructions. In one scenario, such downloads may include a malicious program targeting cellular telephones, for example, spread through Bluetooth® wireless systems. Such executable instructions may be a worm program whose task could be as simple as stealing the cellular telephone's address book or generating costly and annoying text message spam. Another potential threat to the integrity of a wireless device may take the form of a "denial of service" attack on a wireless-service provider by making the cellular telephone dial many numbers in rapid succession. In another example, malicious applications may affect the operation of the wireless device, allowing the wireless device to be used for a different wireless network service provider than the one for which it was purchased. In this case, the original wireless network service provider may lose money if it subsidized the price of the wireless device based on the agreement that the wireless device would only be used on the original network service provider's network.

Furthermore, an initial scan of a downloaded application may not prove sufficient to detect possible malicious intent. It may be necessary to monitor the operation of the program to determine whether or not an application first thought to be authorized has either been modified or has indeed performed some unauthorized act, i.e., accessed a protected memory location.

In addition to the possible loss of device integrity due to either malicious or unintentional downloading of unauthorized executable instructions, a cellular carrier network may lose revenue by uncompensated downloading of otherwise non-malicious executables. For example, in many cases when a new mobile device is introduced to the market and is well received by the public, a host of software companies will attempt to cash in on the popularity of the product by offering third party applications. These executables, when made available to the user via sources other than the cellular manufacturer or carrier, not only may adversely affect the operation of the wireless device but may also result in millions of dollars in lost revenue.

Accordingly, it would be advantageous to provide an apparatus and method that allows for scanning a wireless device for executable instructions, monitoring its operation, and may include the deleting and otherwise disabling of such instructions based upon an authorization schema.

SUMMARY

The described embodiments comprise apparatus, methods, computer readable media and processors operable for managing executable instructions on a wireless device based upon a flexible authorization configuration and control commands supplied by at least one of a network service provider, wireless device manufacturer and other authorizing parties. The authorization configuration may initiate the detection, deletion, disablement or otherwise management actions of malicious files or other unauthorized executable instructions so that the quality of service of the respective wireless device is maintained, revenue is generated, and lost revenue is minimized.

Virus scanning methods and apparatus for wireless devices may include an authorization module operable on a wireless device to apply an authorization schema to executable instructions on the wireless device. The executable instructions may not be limited to executable file types. For instance, executable instructions may be found in any file type, for example, picture files, movie files, text files, and sound files, i.e. ring tones. The memory may be scanned according the authorization schema and a log of unauthorized instructions may be generated and forwarded to a user manager.

The user manager may be operable to analyze the log to determine whether the logged executable instructions may be authorized, or whether the logged executable instructions contain a virus or is otherwise unauthorized, as well as to determine any action to be taken in regard to the executable instructions identified as unauthorized executable instructions.

In addition, the user manager may be operable to generate an authorization report which may be viewable by an operator. If not approved by the operator, the unauthorized executable may be treated as being undesirable, such as a virus, and may be deleted or otherwise disabled.

Additionally, the network service provider may need to be able to disable an executable on a wireless device when the executable for that specific wireless device has become obsolete, or when the wireless device is being used on a different service provider's network in violation of an agreement.

In one aspect, a wireless device comprises a memory comprising executable instructions, a device type corresponding to wireless device, and an authorization configuration having an authorization schema that identifies at least one of authorized and unauthorized executable executable instructions, wherein the authorization schema is based upon a device type associated with the wireless device. The wireless device additionally comprises an authorization module resident in the memory. The authorization module comprises authorization logic operable to scan executable instructions and generate a log based upon the authorization configuration. The log comprises an identification of the executable instructions determined to be unauthorized based upon the authorization schema.

Another aspect of a wireless device may comprise means for obtaining an authorization configuration comprising an authorization schema that identifies at least one of authorized executable instructions and unauthorized executable instructions, wherein the authorization schema is based upon a device type associated with the wireless device. This aspect of the wireless device may further comprise means for scanning executable instructions based upon the authorization configuration, and means for logging at least portions of the scanned executable instructions into a log based upon the authorization schema. Additionally, this aspect of the wireless device may further comprise means for forwarding the log to another device to determine a disposition of the logged executable instructions.

In another aspect, a method of managing executable instructions on a wireless device comprises obtaining an authorization configuration comprising an authorization schema that identifies at least one of authorized and unauthorized executable instructions, wherein the authorization schema is based upon a device type associated with the wireless device. This aspect of the method also comprises scanning executable instructions based upon the authorization configuration, and logging at least portions of the scanned executable instructions into a log based upon the authorization schema. Additionally, this aspect of the method further comprises forwarding the log to another device to determine a disposition of the logged executable instructions. In a related aspect, at least one processor is configured to perform the above-described actions. Another related aspect comprises a machine-readable medium comprising instructions which, when executed by a machine, cause the machine to perform operations comprising the actions noted above.

A further aspect comprises an apparatus for managing executable instructions on a wireless device comprises a configuration generator operable to generate and transmit an authorization configuration for receipt by a wireless device. The authorization configuration comprises an authorization schema that identifies at least one of authorized executable instructions and unauthorized executable instructions, wherein the authorization schema is based upon a device type associated with the wireless device. Further, the apparatus comprises an information repository operable to receive and store a log, the log comprising unauthorized executable instructions on the wireless device based on the authorization configuration. Additionally, the apparatus comprises an executable instruction control module comprising an analyzer operable to generate an authorization report based on the log.

A further aspect of an apparatus for managing executable instructions on a wireless device may comprise means for generating an authorization configuration executable to initiate scanning and logging of executable instructions resident on a wireless device. The authorization configuration comprises an authorization schema that identifies at least one of authorized executable instructions and unauthorized executable instructions, wherein the authorization schema is based upon a device type associated with the wireless device. This aspect further comprises means for forwarding the authorization configuration for receipt by the wireless device, and means for receiving a generated log from the wireless device based on the authorization configuration. Additionally, this aspect comprises means for generating an authorization report based on the received log.

An aspect of a method of executable instruction management on a wireless device comprises generating an authorization configuration executable to initiate scanning and logging of executable instructions resident on a wireless device. The authorization configuration comprises an authorization schema that identifies at least one of authorized executable instructions and unauthorized executable instructions, wherein the authorization schema is based upon a device type associated with the wireless device. This aspect further comprises forwarding the authorization configuration for receipt by the wireless device, and receiving a generated log from the wireless device based on the authorization configuration. Additionally, this aspect comprises generating an authorization report based on the received log. In a related aspect, at least one processor is configured to perform the above-described actions. Another related aspect comprises a machine-readable medium comprising instructions which, when executed by a machine, cause the machine to perform operations comprising the actions noted above.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

Figure 1:
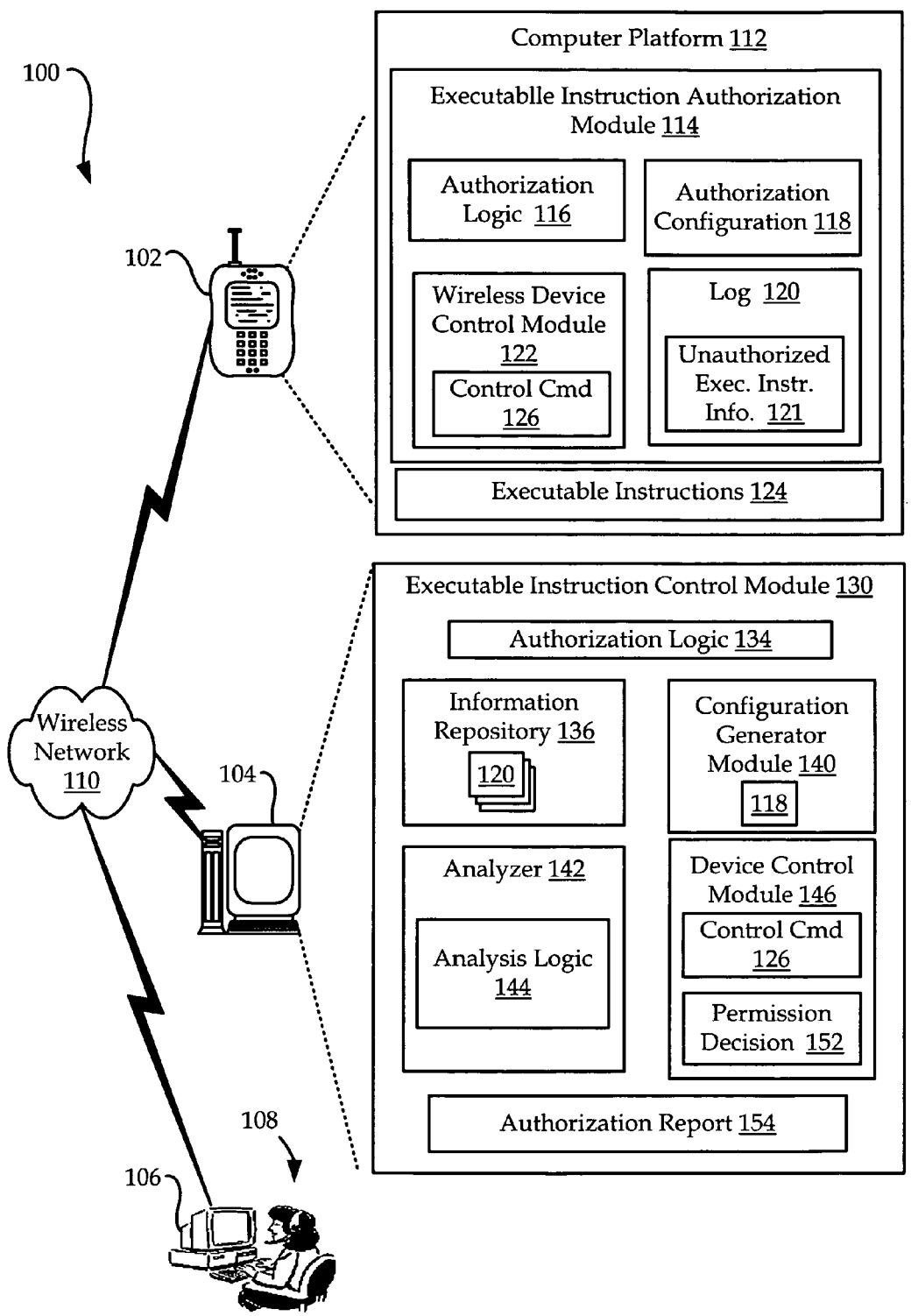
FIG. 1 is a schematic diagram of one aspect of a system for managing executable instructions on a wireless device based upon an executable instructions authorization configuration.

FIG. 1 illustrates one aspect of a system 100 comprising apparatus and methods of managing executable instructions on a wireless device based upon an authorization configuration. The term "executable instructions," as used herein, refers to software applications and/or a piece of code that may be stored in the wireless device as a standalone program and/or file, and/or that may be imbedded within files containing predominantly non-executable data, such as picture files, movie files, text files, and sound files. These executable instructions may be received by and/or stored on and/or executed by a wireless device. System 100 is operable to monitor and analyze all executable instructions received by and/or resident on a wireless device to detect unauthorized executable instructions, which may be referred to as a "virus," and to determine a disposition of such instructions. Unauthorized executable instructions, or viruses, may be any unapproved instructions, which may include instructions having malicious effects on the operations of the wireless device, and which may further include other instructions having non-malicious effects on the wireless device, as will be discussed below in more detail.

Generally, system 100 may include a wireless device 102 in communication with a user manager server 104, which provides device control functionality, via a wireless network 110. Further, user manager 104 may be in communication with an operator workstation 106, which provides access to the functionality of user manager server 104, such as via a wired or wireless connection. In one scenario, wireless device 102 receives authorization configuration 118, which may be provided by executable instruction control module 130 of user manager 104, to detect executable instructions 124 received by and/or resident on the wireless device, and to determine whether or not the instructions are unauthorized and thus may be considered a "virus." Log 120 on wireless device 102 stores unauthorized executable instruction information 121, which comprises at least some relevant portion of any detected virus and/or unauthorized executable instructions, and as may be dictated by authorization configuration 118. User manager 104 receives log 120 from wireless device 102, and analyzer 142 processes the log and generates an authorization report 154 providing details relating to the executable instructions detailed by the unauthorized instruction information 121. The authorization report 154 may be reviewed, such as by operator 108 at workstation 106, and a control command 126 may be generated to provide a disposition of the unauthorized executable instructions 121, such as to delete a virus or allow a non-virus, and/or to update authorization configuration 118, such as to update the identification of authorized and/or unauthorized executable instructions, based on the information contained in authorization report 154.

Figure 3:
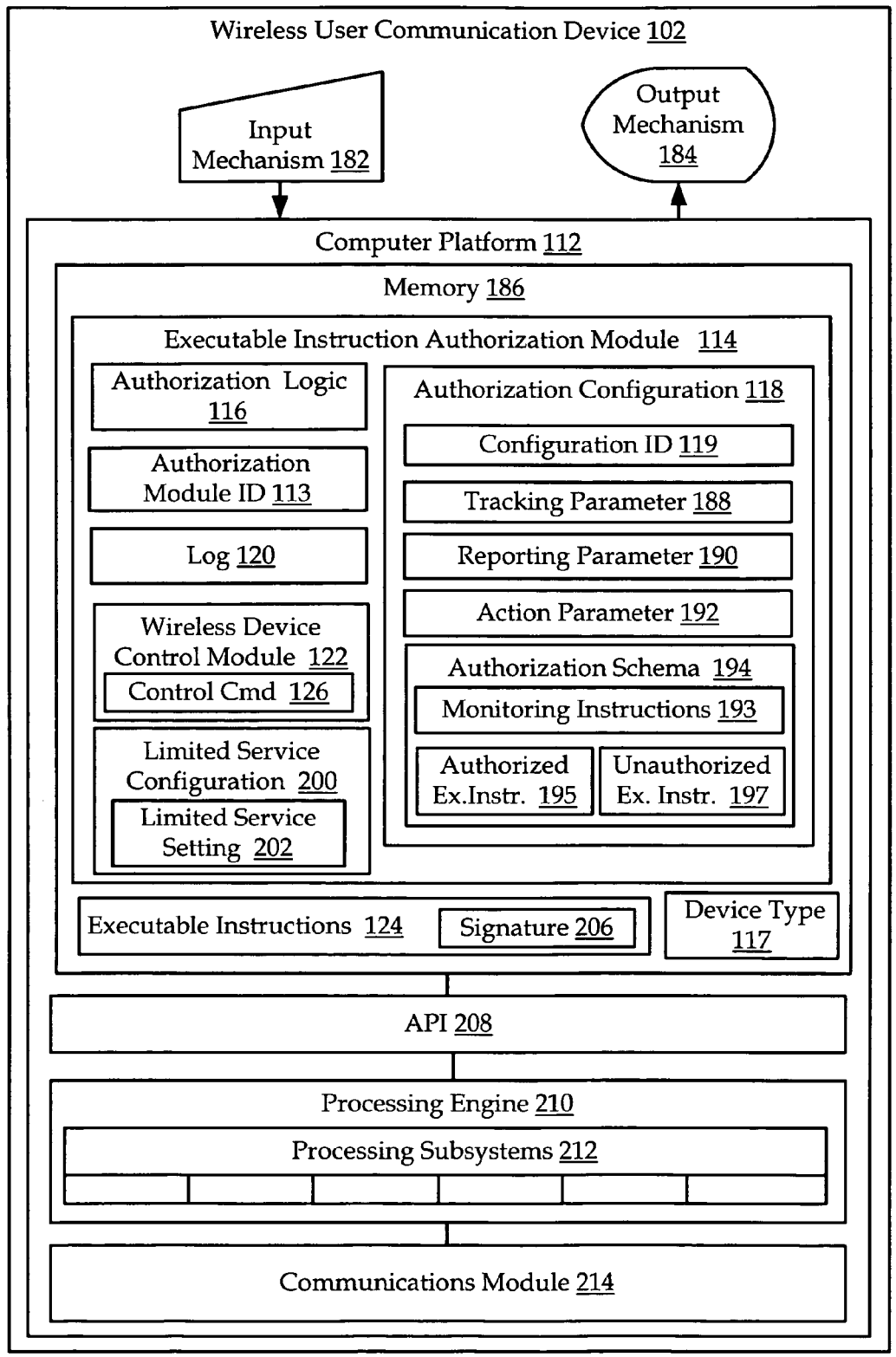
FIG. 3 is one aspect of an architecture diagram of the wireless device of FIG. 1.

FIGS. 1 and 3 disclose an aspect of the wireless device 102, which may comprise a computer platform 112 that includes a executable instruction authorization module 114. Executable instruction authorization module 114 may be downloaded to the wireless device 102 via at least one of several mechanisms including, but not limited to, wireless transmission over a wireless network, a wired connection to a personal computer (PC), and loaded at the time of manufacture of the wireless device or the associated computer platform. The executable instruction authorization module 114 further comprises various software components, including but not limited to, authorization logic 116, authorization configuration 118, a log 120, and a wireless device control module 122. Wireless device control module 122 may further include control command 126 operable to delete, disable, or otherwise render inoperative any executable instructions 124 determined to be unauthorized, i.e. a "virus," by the definition described herein.

Figure 2:
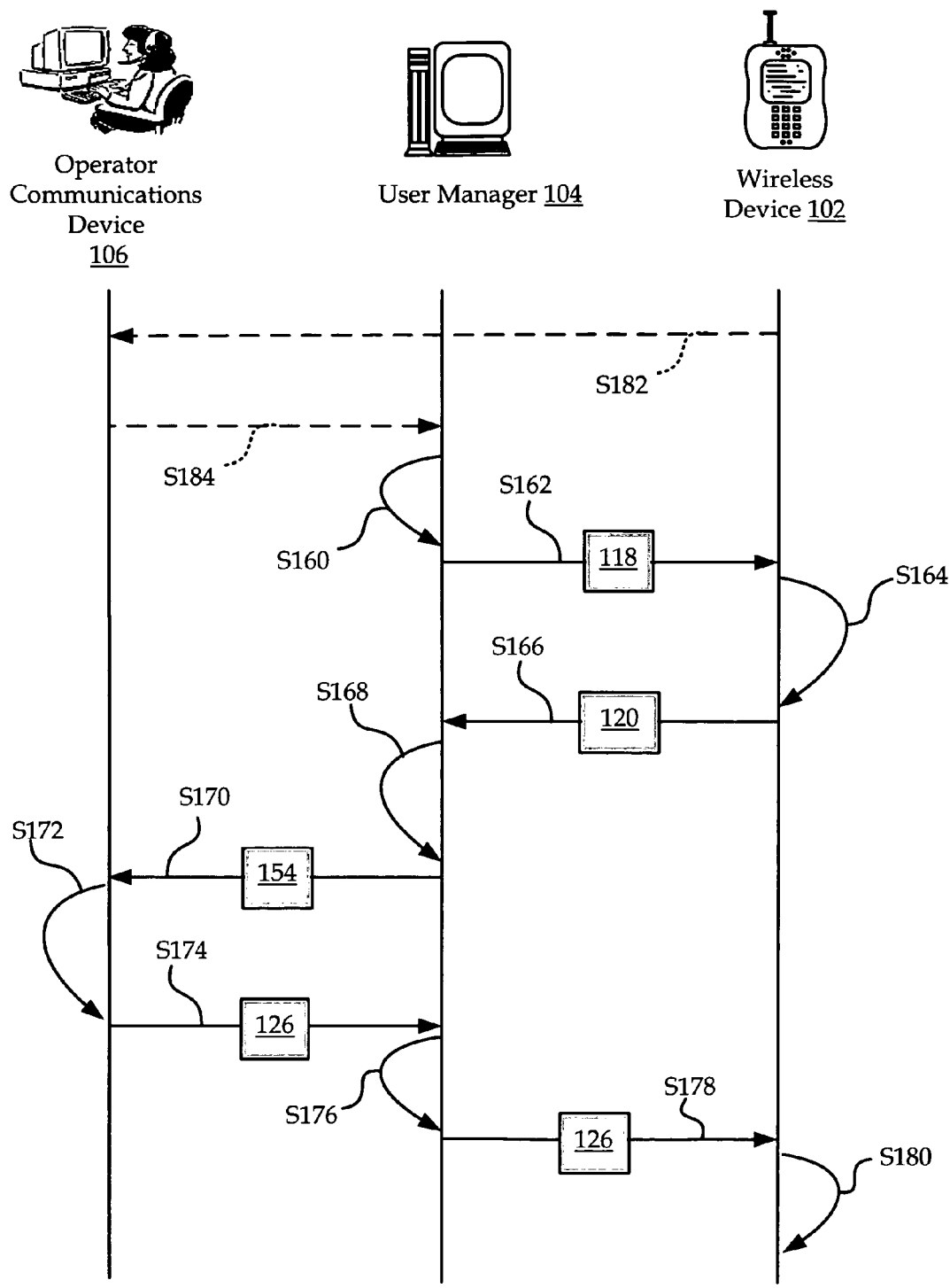
FIG. 2 is a message flow diagram associated with the system of FIG. 1.

FIG. 2 illustrates an aspect of a sequence of messages transmitted between the operator communication device 106, such as a computer workstation, the user manager server 104, and a wireless device 102. At step 160, an executable instruction control module 130 resident on user manager 104 may generate an initial authorization configuration 118 that may be transmitted, at step 162, to the wireless device 104. Alternatively, the user manager 104 may generate and transmit at least portions of an updated authorization configuration 118 to replace or update an existing configuration 118.

At step 164, authorization logic 116, which may run as a background process in the wireless device 102, is operable to parse the received configuration file 118 to derive configuration parameters, including but not limited to tracking parameter 188, reporting parameter 190, action parameter 192, and authorization schema 194. Based upon tracking parameter 188, the authorization logic 116 may scan executable instructions upon being downloaded onto device 102, or may scan all memory resident executable instructions on the wireless device 102.

Scanning for unauthorized executable instructions may be implemented using at least one of several mechanisms stored in the authorization schema 194. Based upon authorization schema 194, specific elements of instructions determined to be unauthorized may be stored in log 120 as unauthorized executable instruction information 121. Alternatively, or in addition, wireless device 102 may include logic that allows for automatic deletion or disablement of unauthorized executable instructions upon detection of the unauthorized executable instructions, as is discussed below in more detail.

At step 166 log 120 may be uploaded from wireless device 102 across a wireless network 110 to the user manager 104. Executable instruction control module 130 may be operable to store log 120 in an information repository 136.

At step 168, executable instruction control module 130 may access log 120 and execute an analyzer 142 operable to process the log 120, analyze the collected data, and generate an authorization report 154. Analyzer 142 is discussed in detail further below.

At step 170, executable instruction control module 130 may transmit authorization report 154, across the wireless network 110 in one aspect, to operator workstation 106 for review. In one aspect, the operator 108 may review the authorization report 154 at step 172 and transmit, at step 174, a control command 126 to the user manager 104, and control manager 130 may validate the command 126 at step 176 before relaying the command to the wireless device 102 at step 178. The command 126 may be operable, at step 180, to execute activities on the wireless device 102, including, but not limited to, deleting and disabling unauthorized executable instructions, restoring previously disabled executable instructions, and/or updating an authorization status of a given executable instruction, such as by adding the executable instruction to an authorized executable instructions list or removing the executable instruction from an unauthorized executable instruction list.

It should be noted that, in some alternate aspects, the above sequence of events may be initiated, at step 182, by wireless device 102 or a device user directly contacting operator communications device 106 or the associated operator 108 to report suspicion of a virus. In this scenario, at step 184, operator communications device 106 or the associated operator 108 sends a message to user manager 104 to direct the downloading of executable instruction module 114 and/or authorization configuration 118 to the respective wireless device 102.

Thus, the present apparatus, methods, computer-readable media and processors operate to provide executable instruction management on a wireless device 102 based upon a modifiable authorization configuration 118.

Referring to FIG. 3, wireless device 102 can include any type of computerized, wireless device, such as cellular telephone 102, personal digital assistant, two-way text pager, portable computer, and even a separate computer platform that has a wireless communications portal, and which also may have a wired connection to a network or the Internet. The wireless device can be a remote-slave, or other device that does not have an end-user thereof but simply communicates data across the wireless network 110, such as remote sensors, diagnostic tools, and data relays.

Apparatus and methods of executable instruction authorization on the wireless device may include scanning, collecting, reporting, deleting, disabling, and restoring activities. Furthermore, the apparatus and methods may include tracking/monitoring the usage of wireless device resources to determine if the operation of any executable instruction 124 comprise unauthorized acts, as defined by authorization configuration 118. Such unauthorized activities may include, but are not limited to, attempting to read/write from/to a predetermined memory location, reading/writing from/to a predetermined memory location, deleting another program/data, and attempting to and/or accessing to predetermined resources, such as an attempt to transmit data via the communications module 214. The tracking/monitoring parameters are user configurable and may be downloaded from a user manager.

Activities performed by the herein described apparatus and methods may be performed on any form of wireless device or computer module, including a wired or wireless communication portal, including without limitation, wireless modems, PCMCIA cards, access terminals, personal computers, telephones, or any combination or sub-combination thereof.

Wireless device 102 may also include input mechanism 182 for generating inputs into wireless device 102, and output mechanism 184 for relaying information to the user of the wireless device. For example, input mechanism 182 may include a mechanism such as a key or keyboard, a mouse, a touch-screen display, and a voice recognition module, while output mechanism 184 may include, but is not limited to, a display, an audio speaker, and a haptic feedback mechanism.

Computer platform 112 may be operable to: transmit data across wireless network 110; receive and execute software applications; and to display data transmitted from user manager 104, or another computer device connected to wireless network 110. Computer platform 112 may also include a memory 186, which may comprise volatile and nonvolatile memory such as read-only and/or random-access memory (RAM and ROM), EPROM, EEPROM, flash cards, or any memory common to computer platforms. Further, memory 186 may include one or more flash memory cells, or may be any secondary or tertiary storage device, such as magnetic media, optical media, tape, or soft or hard disk. Additionally, memory 186 may store executable instructions 124, as well as device type information 117, such as one or more of a make, model, manufacturer, version, etc. of the type of wireless device 102.

Further, computer platform 112 may include a processing engine 210, which may be an application-specific integrated circuit ("ASIC"), or other chipset, processor, logic circuit, or other data processing device. Processing engine 210 is operable to execute an application programming interface ("API") layer 208 that may interface with any resident programs, such as executable instruction authorization module 114, stored in memory 186 of the wireless device 102. In one aspect, API 208 is a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processing engine 210 includes various processing subsystems 212 embodied in hardware, software, firmware, executable instructions, data, and combinations thereof, that enable the functionality of wireless device 102 and the operability of the wireless device on wireless network 110. For example, processing subsystems 212 allow for initiating and maintaining communications, and exchanging data, with other networked devices. In one aspect, such as in a cellular telephone, processing engine 210 may include one or a combination of processing subsystems 212, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, limited services, security, authentication, USIM/SIM, voice services, graphics, USB, multimedia such as MPEG, GPRS, etc. For the disclosed aspects, processing subsystems 212 may include any subsystem components that interact with applications executing on computer platform 112. For example, processing subsystems 212 may include any subsystem components that receive data reads and data writes from API 208 on behalf of the resident executable instruction authorization module 114. Further, at least a portion of information relating to executable instruction, gathered and logged in log 120, may be available from these subsystems 212.

Computer platform 112 may further include a communications module 214 embodied in hardware, software, executable instructions, data, and combinations thereof, operable to enable communications among the various components of the wireless device 102 and wireless network 110. Communications module 152 may comprise any component/port/interface that may include any point of entry into, and/or any point of exit from wireless device. As such, communications module 152 may include interface components for hardwired communications and for wireless communications.

Computer platform 112 further includes executable instruction authorization module 114, which is operable based on authorization configuration file 118 and may be loaded into memory 186 by various mechanisms including, but not limited to: being generated by any computer device connected to wireless network 110, such as user manager 104; locally transmitted to the wireless device 102 such as by a manual input from a user using input mechanism 182 and/or through transmission from a locally-connected media reader; and, having been loaded on the wireless device 102 at the time of manufacture. Further, executable instruction authorization module 114 may comprise an authorization module identification (ID) 113, such as one or more of a name, a version, etc., that identifies the particular configuration of the given authorization module.

As disclosed above, authorization logic 116 of executable instruction authorization module 114 may be operable to collect, store, and provide access to, or forward to other devices, selected information relating to executable instructions 124 based on authorization configuration 118. Furthermore, executable instruction authorization module 114 may be loaded onto the wireless device 102 during the initial assembly process, downloaded from a device on wireless network 110, or loaded via direct connections during a configuration process.

As disclosed, authorization schema 194 may comprise an identification of authorized executable instructions 195 and/ or unauthorized executable instructions 197. For example, authorized executable instructions 195 and/or unauthorized executable instructions 197 may include some reference or identification of at least a portion of executable instructions that have been deemed authorized and/or unauthorized, respectively, such as by a party having control over memory 186 of wireless device 102, such as a network service provider. In one aspect, for example, authorization schema 194 may include a signature 206 comprising data relating to executable instructions 124, including but not limited to at least one of application/file name, version, size, date/time created and creator, if any. For example, authorized executable instructions 195 may include a set of applications, files and/or data having embedded executable instructions, all of which are authorized for use on wireless device 102, such as operating system software, application-specific software, and macro imbedded data files. In contrast, unauthorized executable instructions 197, which may be referred to as a "virus," may include a set of applications, instruction imbedded files and/or data having embedded executable instruction, all of which are not authorized for use on wireless device 102, such as known viruses and known incompatible application-specific software. It should be noted, however, that applications defined as a "virus" on one network, or on a particular wireless device 102, may be considered authorized or approved by another set of network carrier and/or wireless device. For instance, an application may require a certain amount of memory and certain hardware components, such as a camera, a large screen, a global positioning system ("GPS") receiver, which may not be available on a user's device. Such a program may be authorized on one wireless device having the system requirements, but may be defined as a "virus" on a non-compliant device to avoid wasting limited resources.

In another aspect, authorization schema 194 may include, but is not limited to, instructions relating to predetermined authorization tests and predetermined authorization test results. For example, these tests and results include: a redundancy check, including a checksum, parity bits, check digits, longitudinal redundancy check, cyclic redundancy check ("CRC"), horizontal redundancy check, vertical redundancy check, cryptographic message digest, Fletcher's checksum, and Adler-32; testing for a predetermined value at a predetermined location within executable instructions 124, where any attempt to conceal malicious or otherwise unauthorized executable instructions would be discovered by a check on the predetermined location; and testing for a predetermined result of applying a predetermined function to all or a portion of the data and/or the code contained within executable instructions 124. Data extracted from the scanned file, and/or authorization test results obtained from applying the above predetermined authorization tests may then compared to predetermined values and/or predetermined results, respectively, stored remotely, such as in executable instruction control module 130, or locally such as in the authorization schema 194, to determine whether or not the given executable instructions are authorized.

In another aspect, authorization schema 194 may include monitoring instructions 193 relating to monitoring the operations of executable instructions 124, such as monitoring predetermined wireless device resources, including memory and peripherals, attempting to be or being utilized by the executable instructions. For example, the authorization schema 194 may monitor the resource utilization of all operating applications, with configurable parameters indicating memory locations, processing subsystems, memory utilization, and allowable or unallowable activities, such as overwriting applications and reading and writing to predetermined areas of memory.

As disclosed relative to the discussion of FIG. 2, the authorization configuration comprises parameters used by the authorization logic 116 to perform the operations disclosed herein.

Tracking parameter 188 may be operative to determine when to scan the memory 124. For example, tracking parameter 188 may instruct logic 116 to scan memory 186 periodically, when new executable instructions are downloaded, when executable instructions are in operation, and when existing information is deleted.

In addition, tracking parameter 188 may determine where to store log 120, for example, in memory 186, or another memory device connectable to the wireless device or accessible to the wireless device 102 over the wireless network 110. In addition, tracking parameter 188 may determine whether the entire memory 186 is scanned or just predetermined portions of the memory, such as executable instructions that are active, that are currently being downloaded, and/or that were downloaded within a past user/system configured period.

Furthermore, tracking parameter 188 may control which portions of executable instruction 124 is deemed to be a "virus" and is therefore logged as unauthorized executable instruction information 121.

Figure 4:
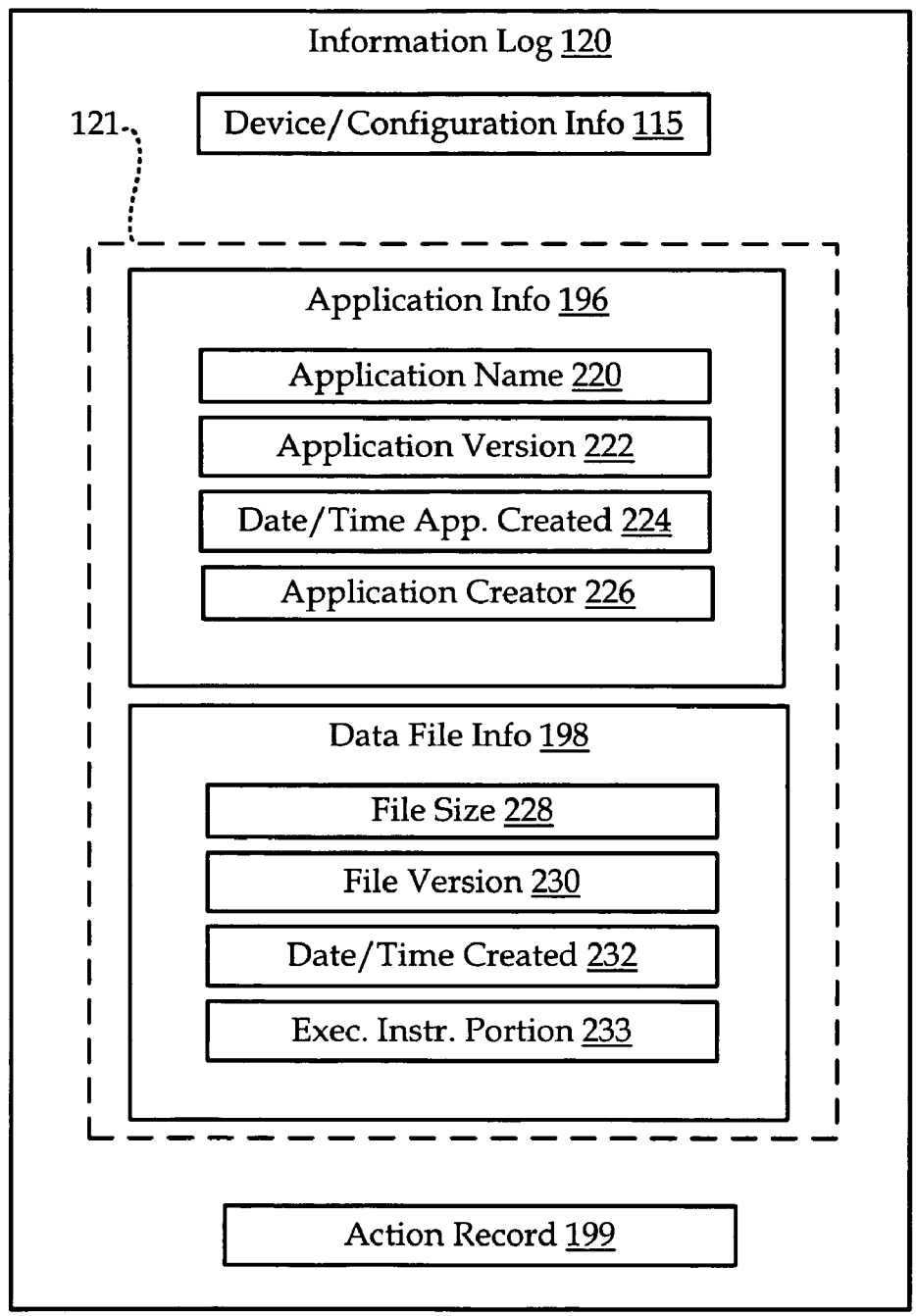
FIG. 4 is a schematic diagram of one aspect of a log associated with the wireless device of FIG. 1.

Referring to FIG. 4, for example, information log 120 may comprise a record of unauthorized executable instruction information 121 which may include, but is not limited to: application information 196 such as the application name 220, application version 222, date and time created 224, and the creator 226 of the application; and data file information 198, such as relating to data files that may contain executable instructions, may include file size 228, file version 230, and date/time created 232, and at least some executable instruction portion 233. Further, information log 120 may include action record 199 of actions taken by authorization module 114, as is discussed below in more detail. Finally, information log 120 may include device/configuration information 115, such as one or a combination of authorization module ID 113 and/or configuration ID 119, and wireless device information such as hardware and software information, for example, information identifying the model of the device, the resident hardware, the resident software, the state of selected hardware and/or software components, etc. and generally any information that may be useful in troubleshooting or determining a diagnostic status of wireless device 102.

In addition, tracking parameter 188 may control the monitoring of running applications, e.g. the actions being requested and/or performed by any executable instructions. Non-limiting, application monitoring may be configured, for example, to occur periodically on a predetermined schedule, within a predefined period after initial loading, based on a predetermined event such as running an application, and on an ongoing basis.

Reporting parameter 190 may configure executable instruction authorization module 114 to selectively transmit log 120 to executable instruction control module 130 across wireless network 110. The timing of log transmission is non-limiting and may be transmitted at a predetermined time, a predetermined interval, and on the occurrence of predetermined events, such as upon downloading of executable instructions, establishing a communication channel with communications network 110 and upon determination of a virus or suspect executable instructions. Further, reporting parameter 190 may determine whom to allow local access to log 120, thereby allowing a remote device such as the user manager 104 to access memory 186 and retrieve log 120 directly.

In one aspect, log 120 is transmitted over an open communication connection between the wireless device 102 and the wireless network 110, "piggybacking" on an ongoing voice or data call across an open connection. Alternatively, in a cellular network configuration, the log 120 may be transmitted to executable instruction control module 130 through short message service ("SMS"). Furthermore, as noted above, an alternate aspect of the user manager module may "pull" the log 120 from the wireless device 102 across the network 110 on a scheduled or ad hoc basis.

Action parameter 192 may instruct logic 116 on how and when to disable, delete, restore or otherwise act upon executable instructions identified as unauthorized. For example, deleting executable instructions may be accomplished by physically deleting the executable instructions from memory 194, while disabling executable instructions may be accomplished by altering some portion of executable instructions 124 to prevent its operation on wireless device 102. Although deleted executable instructions may or may not be restored, one aspect of system 100 may allow disabled executable instructions to be recovered by an appropriate setting of action parameter 192, and/or by an appropriate control command 126 transmitted from the user manager 104 or operator 108.

Action parameter 192 may be operable to instruct logic 116 to act upon unauthorized executable instructions without further communications/commands from a remote source. For example, in one aspect where authorization schema 194 has locally determined that downloaded executable instructions 124 is either not identifiable as authorized executable instruction 195 or is identifiable as unauthorized executable instruction 197, i.e. an instruction that contains a virus or is otherwise unauthorized, action parameter 192 may identify a corresponding action to take by the executable instruction authorization module 114. In this scenario, for example, based on action parameter 192, authorization module 114 may delete or disable the given executable instruction 124, and the action taken may be logged as an action record 199 in log 120.

Additionally, authorization configuration 118 may include a configuration identification (ID) 119, such as one or more of a name, a version, etc., which identifies the given set of parameters associated with the given configuration.

Executable instruction authorization module 114 further includes wireless device control module 122, which under control of authorization logic 116 is operable to execute on the wireless device 102 a locally or remotely generated control command 126. Wireless device control module 122 may have the same components and/or functionality as a user manager device control module 146 (FIG. 1), and, as will be explained in more detail below, the wireless device control module 122 may request verification and/or authorization of a control command 126 before its execution.

For example, control command 126 may be any executable operation on wireless device 102 related to handling executable instructions 124 identified as unauthorized executable instructions. For example, control command 126 may include, but is not limited to, the operations of deleting, disabling, and/or restoring executable instructions. Control command 126 may comprise actions similar to those discussed above with regard to action parameter 192, which essentially may be a predetermined or preprogrammed control command 126. In general, the control command 126 is issued based upon a review of executable instructions 124 identified by executable instruction authorization module 114 as being unauthorized, which may be executable instructions directly identifiable as unauthorized executable instructions 197 and/or which may be executable instructions that are not identifiable as authorized executable instructions 195. Based upon an inspection, such as by operator 108, of the information relating to executable instructions 124 reported in log 120, a determination of the status of the logged executable instructions may be made, and control command 126 issued to delete, disable or restore the executable instructions on the wireless device 102. It should be noted that other control commands 126 may be utilized depending on the given scenario.

Further, executable instruction authorization module 114 may include a limited service configuration 200 operable to establish a limited-access communications channel across the wireless network 110, which, in one aspect, is generally not available to the end user of wireless device 102. For example, the limited-access communications channel may be used for transmitting log 120 or for receiving control command 126. Further, in the case when communications from wireless device 102 have otherwise been disabled, the limited-access communications channel may allow emergency calls to an operator 108 or other designated party. The identification and set-up of the limited-access communications channel is based on a limited service setting 202. Limited service setting 202 may identify the type of communications that are allowed, and may identify the associated communication channels that can be utilized. Limited service configuration 200 may be received over the wireless network 110, may be locally transferred to wireless device 102, such as through a serial connection, or may be preloaded on the wireless device 102.

Referring back to FIG. 1, user manager 104 may comprise at least one of any type of server, personal computer, mini computer, mainframe computer, or any computing device either special purpose or general computing device. Further, there can be separate servers or computer devices associated with user manager 104 that work in concert to provide data in usable formats to parties, and/or to provide a separate layer of control in the data flow between the wireless devices 102 and user manager 104. User manager 104 (or plurality of servers) can send software agents or applications, such as the executable instruction authorization module 114, to wireless device 102 across wireless network 110, such that the wireless device 102 returns information from its resident applications and subsystems 212.

User manager 104 comprises executable instruction control module 130 which may further include software, hardware, data, and generally any executable instructions operable to analyze and authorize executable instructions on wireless device 102. Furthermore, executable instruction control module 130 may be operable to download all or a portion of executable instruction authorization module 114 to a wireless device 102. Further, executable instruction control module 130 may include authorization logic 134 which is executable to generate authorization configuration 118 and manage the collection and analysis of log 120 from wireless device 102. As previously disclosed, executable instruction control module 130 may "pull" the log 120 based on commands from an authorized user, such as operator 108, or the log may be "pushed" from the wireless device 102.

Figure 5:
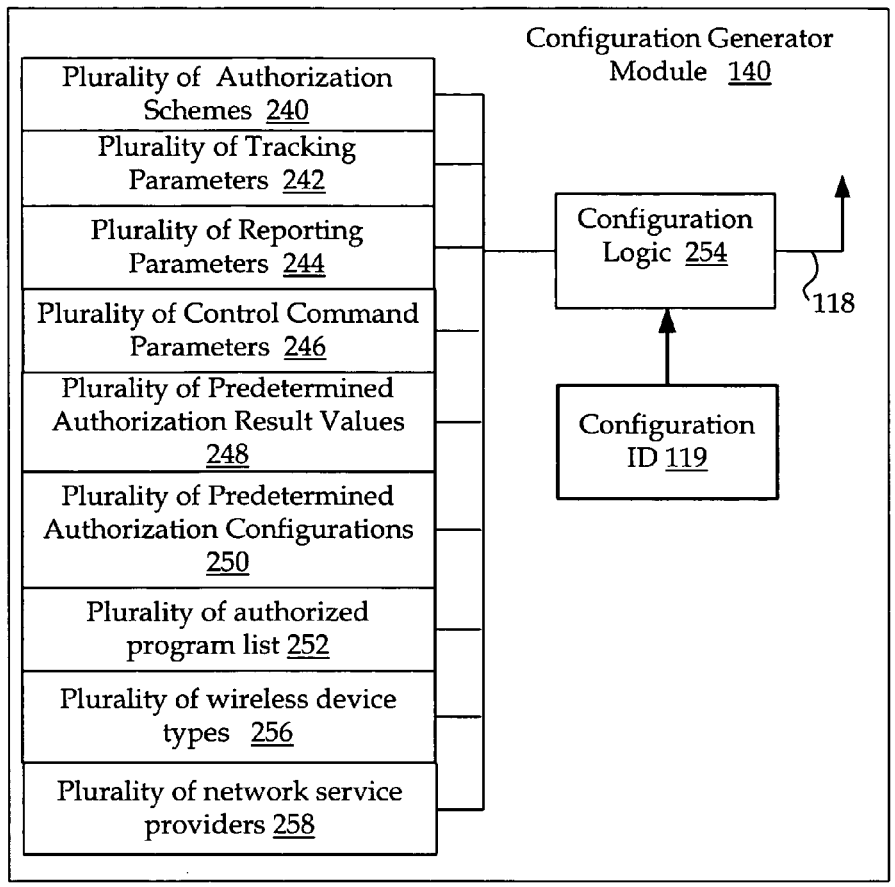
FIG. 5 is a schematic diagram of one aspect of an configuration generator module associated with the user manager of FIG. 1.

Referring to FIGS. 1 and 5, an aspect of an executable instruction control module 130 may include configuration generator module 140 that includes hardware, software, firmware, executable instructions, data, and/or any other associated logic that allows the configuration generator module 140 to generate authorization configuration 118. In one aspect, configuration generator module 140 may be operable to execute authorization logic 134 that assembles the various components of a given authorization configuration 118 based on selections from a number of parameters. For example, parameters that make up authorization configuration 118 may vary depending on the type/make/model of the wireless device and/or the network service provider. As such, configuration logic 254 may provide a user with the ability to select from a menu of a plurality of wireless device types/models 256 and a plurality of network service providers 258 in order to generate an appropriate menu from which to select the parameters of authorization configuration 118.

Similarly, there may be one or more of each type of parameter comprising authorization configuration 118. For example, configuration logic 254 may provide a user with the ability to select from a menu of at least one of a plurality of authorization schemas 240, a plurality of tracking parameters 242, a plurality of reporting parameters 244, a plurality of control command parameters 246 and a plurality of predetermined authorization result values 248. Alternatively, rather than selecting the various parameters individually, configuration logic 254 may provide the user with the ability to select from a menu of a plurality of predetermined authorization configurations 250, which include predetermined groupings of the above-noted parameters that comprise authorization configuration 118.

Further, in one aspect, the selected one of the plurality of wireless device types/models 256 and the selected one of the plurality of network service providers 258 may be correlated to a given one of a plurality of types of executable instructions 252, such as application files and data files, and/or a predetermined set of authorization parameters that are appropriate for a particular wireless device 102. For example, for an XYZ brand of wireless device operating on ABC wireless service provider, configuration logic 254 may be able to determine which executable instructions 124 the wireless device 102 should have installed, and thus may generate authorization configuration 118 that includes the appropriate set of corresponding parameters.

Once the specific parameters of a given configuration 118 are determined, then configuration logic 254 may assign unique configuration ID 119 to the given configuration, and may store this configuration in a library for later recall, such as among plurality of predetermined authorization configurations 250. Further, configuration logic 254, and/or another component of executable instruction control module 130, may be operable to transmit authorization configuration 118 to one or more wireless devices 102 to initiate the monitoring and authorization of executable instructions 124 on that device.

Executable instruction control module 130 may include information repository 136 for storing logs 120 received from wireless device 102 based on executing authorization configuration 118. Information repository 136 may include any type of memory or storage device.

Executable instruction control module 130 may comprise analyzer 142 operable to analyze logs 120 and generate a wireless device executable instruction analysis report 154 viewable by operator 108. Analyzer 142 may further include hardware and analysis logic 144, such as decision-making routines, statistical programs, and combinations thereof, for analyzing and interpreting logs 120. Furthermore, in addition to making the full analysis report 154 available to an authorized user, the executable instruction control module 130 may be operable to generate an E-mail, comprising a message including portions of report 154, to a device, such as the operator communication device 106.

Figure 6:
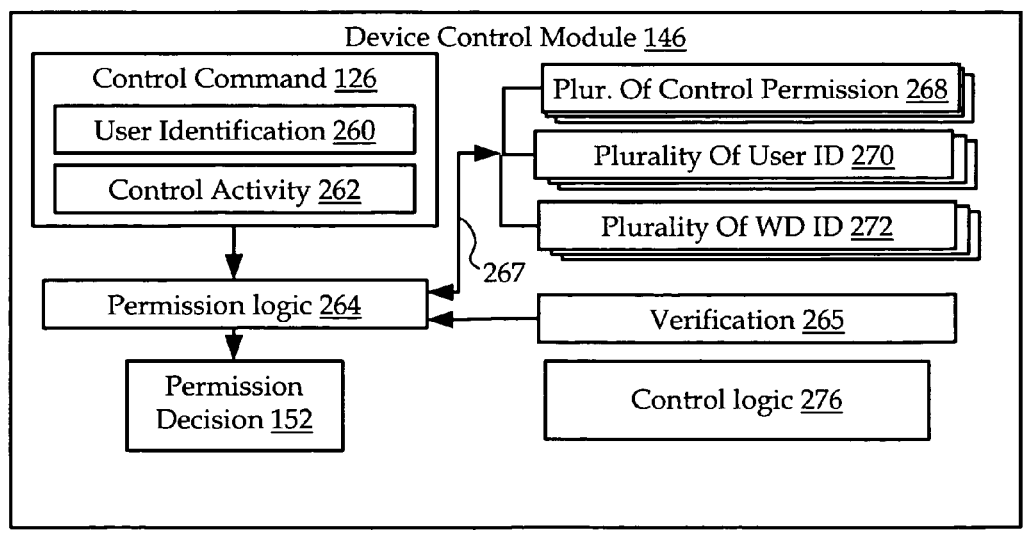
FIG. 6 is a schematic diagram of one aspect of a device control module associated with the user manager of FIG. 1.

Referring to FIG. 6, the executable instruction control module 130 may comprise a user manager device control module 146 operable, by execution of control logic 276, to receive/generate control command 126, either locally or remotely, and either execute control command 126 on wireless device 102 or transmit control command 126 to wireless device 102. In one aspect, for example, control command 126 may contain an operator or user identification ("ID") 260 and a control activity 262. Operator ID 260 may be some manner of identifying the originator of control command 126, i.e. operator 108. For example, operator ID 260 may be a name, a number, a digital signature, a hash, or any other type of data or value that may be associated with a party. Further, operator ID 260 may not be explicitly contained in the control command 126, but rather may be derived from the origin of control command 126.

Control activity 262 may be the operation to be performed on wireless device 102 by executable instruction authorization module 114 through executing control command 126. As mentioned above, these operations may include downloading authorization configuration 118, deleting executable instructions, disabling executable instructions, and restoring disabled executable instructions. Before executing or forwarding the control command 126, user manager device control module 146 may execute permission logic 264 to verify an intent to perform the action, as well as to determine the authenticity or authority of the user issuing control command 126. For example, a verification 265 may be obtained in response to a prompt to user manager 104, operator 108, and/or whomever issued the command to confirm whether the issuer actually wishes to execute control activity 262 on wireless device 102. Further, for example, to determine an authorization 267, permission logic 264 may parse operator ID 260 and control activity 262 from control command 126 and utilize a database of a plurality of user IDs 270 correlated with a plurality of control permissions 268, and correlated with a plurality of wireless device identifications (IDs) 272. Thus, based upon whether verification 265 is received and/or whether proper authorization 267 is found, device control module 146 generates a permission decision 152, which determines whether or not to execute the given control command 126.

Control permissions 268 may identify one or more authorized control activities 262 for a given operator ID 260 and/or wireless device IDs 272. For instance, certain operators may be restricted to certain control activities, or to being able to control certain wireless devices. It should be noted, however, that the plurality of operator IDs 270, the plurality of control permissions 268 and the plurality of wireless device identifications (IDs) 272 may be correlated in any manner. For example, control command 126 may contain a user ID 260 of an operator 108, and a control activity 262 of "disable executable instructions" for a particular one of the plurality of wireless device identifications 272. Permission logic 264 searches the database of control permissions 268 and user IDs 270 to determine if the operator 108 was permitted to disable executable instructions on the given wireless device 102.

The actual location of the disclosed components of the executable instruction control module 130 is non-limiting and may be physically located on a server or other device connected to wireless network 110.

Figure 7:
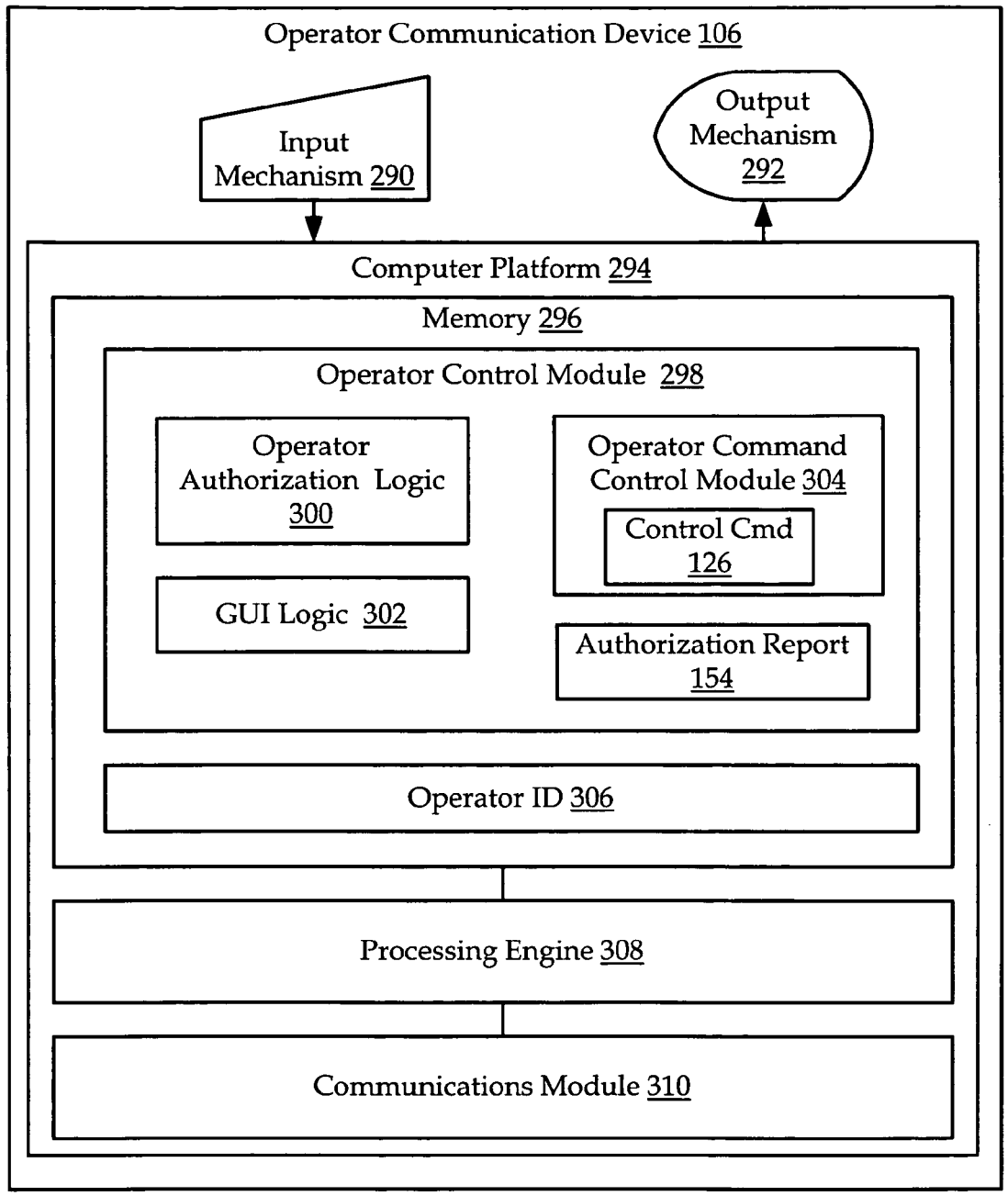
FIG. 7 is one aspect of an architecture diagram of the operator device of FIG. 1.

Referring to FIG. 7, an aspect of an operator communication device 106 staffed by an operator 108 to review authorization report 154 and approve unauthorized wireless executable instructions 124. Executable instructions not approved by operator 108 may be treated as a virus.

Operator communications device 106 may comprise an input mechanism 290, and an output mechanism 292 interconnected to a computer platform 294. The input mechanism 290 and the output mechanism 292 may be similar to their respective counterparts 182, 184 on wireless device 102. The operator computer platform 294 may further comprise a memory 296 for storing applications and data files, a processing engine 308, and a communications module 310 operable to transmit and receive messages and data between the operator position 106, the user manager 104, wireless device 102, as well as any network component on wireless network 110.

Memory 296 may comprise an operator control module 298 made executable by processing engine 308. As the number of operator communication devices 106 and the number of operators 108 are non-limiting, an operator identification ("ID") parameter 306 may be entered into memory 296 by operator 108 and may be operable to identify the operator of the operator communication device 106 to network components including the user manager 104 and the wireless device 102.

The operator control module 298 may further include authorization logic 300 operable in conjunction with Graphic User Interface (GUI) logic 302, input mechanism 290, and output mechanism 292, to guide the operator through any analysis and command activity selection and transmission. The GUI logic 236 may control, for example, e-mail communication, report presentation, as well providing a menu for selecting and transmitting any control command 126 to the user manager 130 and wireless device 102.

Although the operator of operator communication device 106 may be a person, as represented by operator 108 in the aspect of FIG. 1, operator 108 may be a computing device comprising hardware, software, executable instructions, data, and combinations thereof for analyzing and responding to report 154 or to an external communication such as from the user of the wireless device 102. Such software may include algorithms, decision-making routines, statistical programs, etc. for analyzing and interpreting report 154. Further, as with the executable instruction control module 130, the operator communication device 106, as well as the computing device 106 associated with operator 108, may reside on any network device of wireless network 110, such as on user manager 104, another server connected to the network, or even on a wireless device 102.

Wireless network 110 includes any communications network operable, at least in part, for enabling wireless communications between wireless device 102 and any other device connected to wireless network 110. Further, wireless network 110 may include all network components, and all connected devices that form the network. For example, wireless network 110 may include at least one, or any combination, of: a cellular telephone network (as embodied in FIG. 8); a terrestrial telephone network; a satellite telephone network; an infrared network such as an Infrared Data Association ("IrDA")-based network; a short-range wireless network; a Bluetooth® technology network; a ZigBee® protocol network; an ultra wide band ("UWB") protocol network; a home radio frequency ("HomeRF") network; a shared wireless access protocol ("SWAP") network; a wideband network, such as a wireless Ethernet compatibility alliance ("WECA") network, a wireless fidelity alliance ("Wi-Fi Alliance") network, and a 802.11 network; a public switched telephone network; a public heterogeneous communications network, such as the Internet; a private communications network; and land mobile radio network.

Suitable examples of telephone networks include at least one, or any combination, of analog and digital networks/technologies, such as: code division multiple access ("CDMA"), wideband code division multiple access ("WCDMA"), universal mobile telecommunications system ("UMTS"), advanced mobile phone service ("AMPS"), time division multiple access ("TDMA"), frequency division multiple access ("FDMA"), orthogonal frequency division multiple access ("OFDMA"), global system for mobile communications ("GSM"), single carrier ("1X") radio transmission technology ("RTT"), evolution data only ("EV-DO") technology, general packet radio service ("GPRS"), enhanced data GSM environment ("EDGE"), high speed downlink data packet access ("HSPDA"), analog and digital satellite systems, and any other technologies/protocols that may be used in at least one of a wireless communications network and a data communications network.

Figure 8:
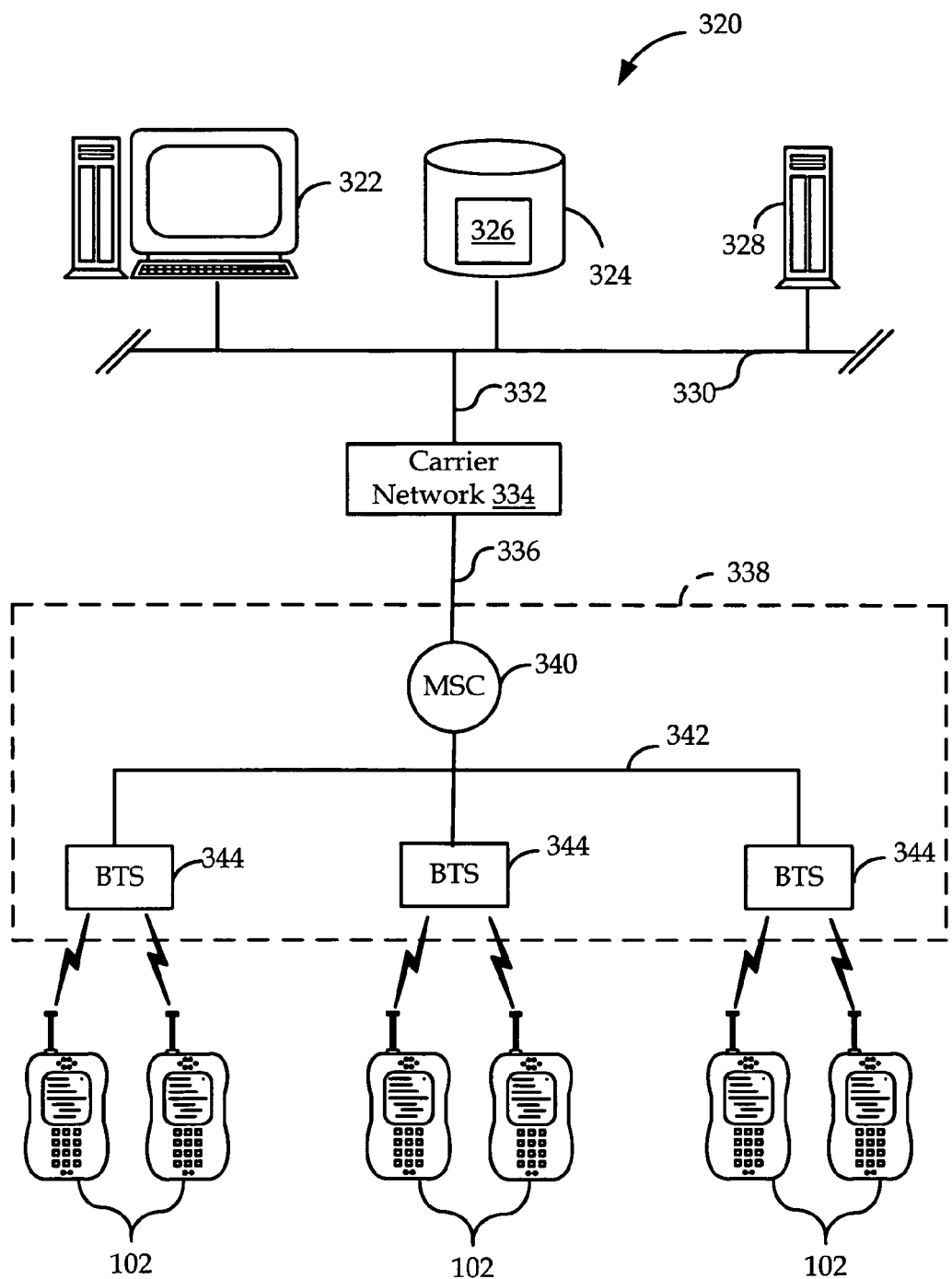
FIG. 8 is a schematic diagram of one aspect of a cellular telephone network aspect of FIG. 1.

Referring to FIG. 8, an aspect of a cellular wireless network 320 comprises at one wireless device 102 and a cellular telephone wireless network 338 connected to a wired network 330 via a carrier network 334. Cellular telephone system 320 is merely exemplary and can include any system whereby remote modules, such as wireless devices 102 communicate packets including voice and data over-the-air between and among each other and/or between and among components of wireless network 338, including, without limitation, wireless network carriers and/or servers.

According to system 320, user manager module 322 may communicate over a wired network 330 (e.g. a local area network, LAN) with data repository 324 for storing authorization information, such as the data logs 326, gathered from the wireless device 102. Further, a data management server 328 may be in communication with user manager module 322 to provide post-processing capabilities, data flow control, etc. User manager module 322, data repository 324 and data management server 330 may be present on the cellular telephone system 320 along with any other network components needed to provide cellular telecommunication services.

User manager module 322, and/or data management server 328 may communicate with carrier network 334 through data links 332 and 336, such as the Internet, a secure LAN, WAN, or other network. Carrier network 334 controls messages (generally being data packets) sent to a mobile switching center ("MSC") 340. Further, carrier network 334 communicates with MSC 340 by a network 336, such as the Internet, and/or POTS ("plain old telephone service"). Typically, in network 336, a network or Internet portion transfers data, and the POTS portion transfers voice information. MSC 340 may be connected to multiple base stations ("BTS") 344 by another network 342, such as a data network and/or Internet portion for data transfer and a POTS portion for voice information. BTS 344 ultimately broadcasts messages wirelessly to the wireless devices, such as wireless device 102, by short messaging service ("SMS"), or other over-the-air methods.

Figure 9:
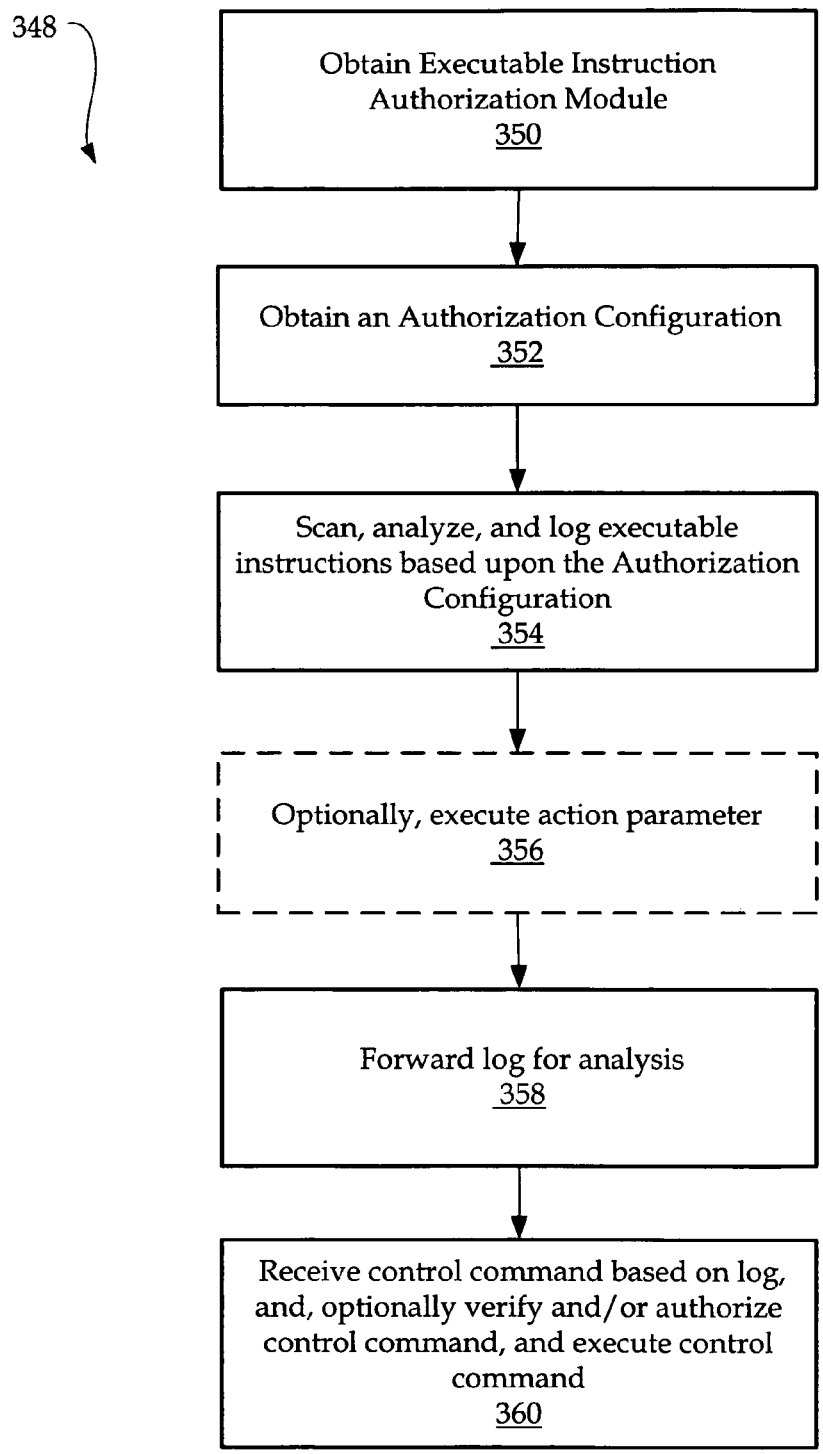
FIG. 9 is a flowchart of one aspect of a method operable on a wireless device for performing executable instruction authorization according to the system of FIG. 1.

Referring to FIG. 9, an aspect of a method 348 for scanning and authorizing executable instructions on a wireless device includes, at step 350, obtaining an executable instruction authorization module. In one aspect, obtaining includes loading at least a portion of executable instruction authorization module 114 on a computer platform 112 of a wireless device 102. For example, the executable instruction authorization module 114 may be provided during the manufacture of the device 102. Alternatively, the executable instruction authorization module 114 may be "pushed" by a executable instruction control module 130 to the wireless device 102 or "pulled" from a executable instruction control module 130 by the wireless device 102 across a wireless network 110 depending, for example, on whether or not the wireless device 102 has the latest version of the executable instruction authorization module 114 for the respective wireless device 102. In another alternative, the pushing or pulling of the executable instruction authorization module 114 to the wireless device 102 may be configurable in any manner, for example: being initiated by a predetermined event.

Once the executable instruction authorization module 114 has been obtained by wireless device 102, at least a portion of authorization configuration 118 may be obtained at step 352. For example, authorization configuration 118 may be loaded into memory 186. Authorization configuration 118 may be provided during the manufacture of the device 102, may be "pushed" by a executable instruction control module 130 to the wireless device 102, or may be "pulled" from a executable instruction control module 130 by the wireless device 102, across a wireless network 110. The obtaining of authorization configuration 118 may be initiated in any manner, for example, being initiated by a predetermined event, such as upon activation, upon power up of the device, upon receiving new executable instructions, and a upon predetermined schedule and/or interval.

Further at step 352, the authorization logic 116 may parse the authorization configuration 118 to determine operating parameters including: tracking parameter 188; reporting parameter 190; action parameter 192; and authorization schema 194, as discussed in detail above.

At step 354, the authorization logic 116 may run as a background process, scanning and analyzing downloaded executable instructions 124 based upon the parsed parameters of the authorization configuration 118.

Optionally, at step 356, depending upon action parameter 192, the executable instruction authorization module 114 may be operable to automatically execute a function on executable instructions identified as unauthorized. For example, action parameter 192 may include definitions of unauthorized executable instructions and corresponding definitions of actions to take in the event of detection of the unauthorized executable instructions. For instance, embodiments of action parameters 192 may include automatically deleting or disabling the executable instructions considered to be suspect or unauthorized based upon the application of the authorization schema 194.

At step 358, the method includes forwarding log 120 for analysis. For example, embodiments may include executable instruction authorization module 114, based upon reporting parameter 190, forwarding the log 120 to a remote device for further analysis. In one aspect, for example, log 120 may be uploaded from wireless device 102 to executable instruction control module 130. Such an uploading mechanism may include a standard HTTP, an FTP, or other data transfer protocol. In other aspects, the log 120 may be transferred from the wireless device 102 using any communication means or connection to which the wireless device 102 has access.

At step 360, the method may further include receiving, optionally verifying and/or authorizing, and executing a control command. For example, wireless device control module 122 may execute the command immediately, or wireless device control module 122 may query the source of control command 126 to verify the control command before executing it. In another example, the device control module 122 may utilize permission logic 264 to check user ID 260 and/or control activity 262 associated with control command 126 against a permissions database to determine an authorization 267 for the control command, thereby formulating permission decision 152. In yet another alternative, device control module 122 may request user manager 104 to operate user manager device control module 146 to verify and/or authorize control command 126. Optionally, the executable instruction authorization module 114 may log the action taken and transmit a message to the user manager 104 and/or the operator 108 indicating the success or failure of the requested action.

Figure 10:
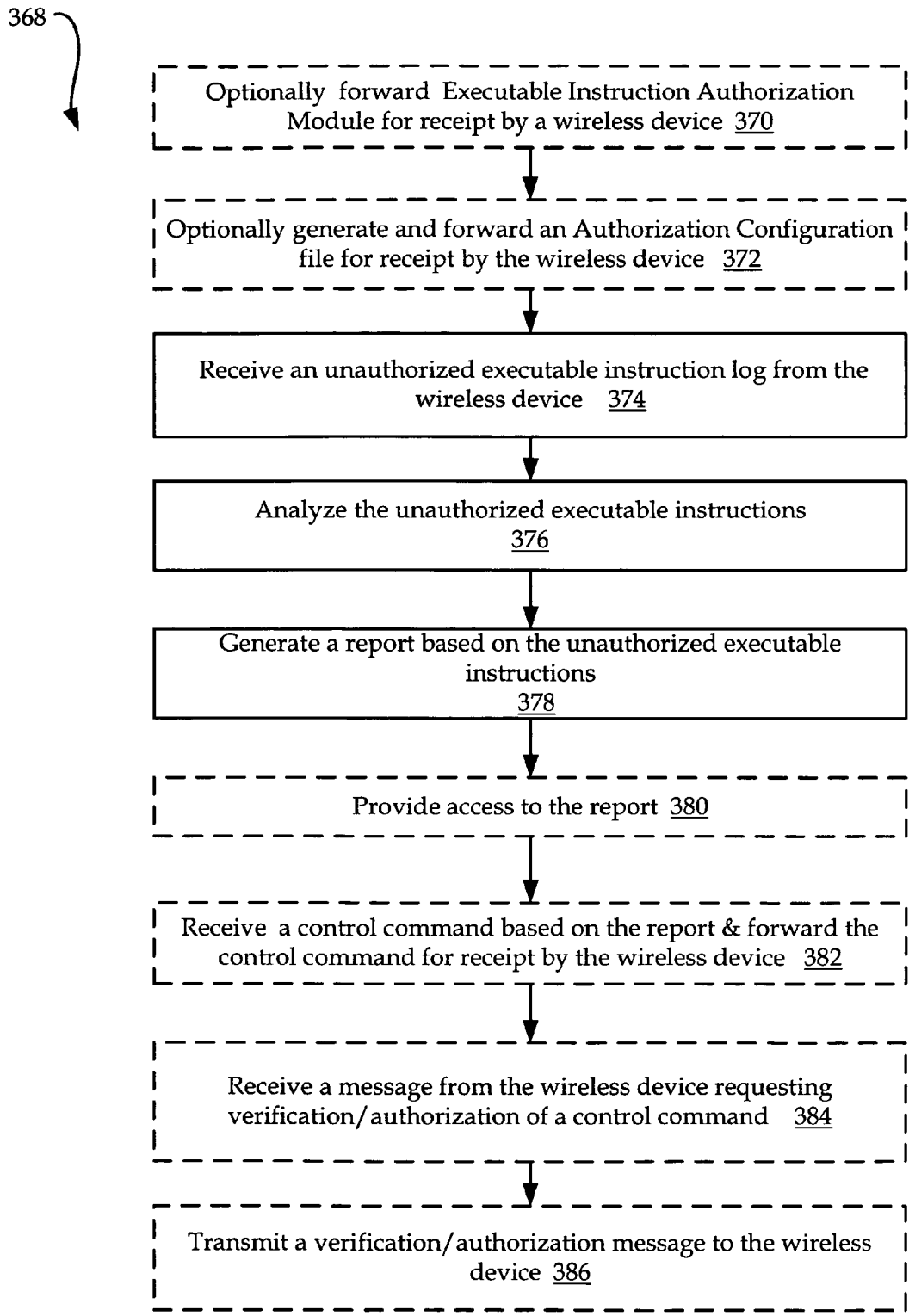
FIG. 10 is a flowchart of one aspect of a method operable on a unit manager for analyzing and providing executable instruction authorization according to the system of FIG. 1.

Referring to FIG. 10, an example of a method 368 that provides for remote authorization of executable instructions 124 on wireless device 102 comprises, at step 370, forwarding a executable instruction authorization module 114 to manage the executable instruction authorization functionality described herein. In one option, executable instruction authorization module 114 is installed into the device memory at the time of manufacture. In another option, because wireless device 102 may not have a executable instruction authorization module 114 pre-installed in memory, a device, such as user manager 104, may forward executable instruction authorization module 114 to wireless device 102 through mechanisms such as a wired connection, or over an air interface using standard protocols, such as HTTP, FTP, or some other data transfer protocol.

Furthermore, at step 372, the method includes generating and forwarding an authorization configuration 118 to the wireless device 102. In one aspect, a user such as a technician or operator 108 may access executable instruction control module 130 and execute configuration generator module 140 to generate authorization configuration 118 for a given wireless device 102. For example, the given wireless device 102 may not have an authorization configuration 118, or the existing configuration 118 on the wireless device 102 may require updating or replacement. In any case, configuration generator module 140 may utilize configuration logic 254 to determine and/or customize the various parameters that comprise authorization configuration 118, and these parameters may vary depending on the type/make/model of the wireless device 102, the actual network service provider, and the type of executable instructions 124.

As such, in some embodiments, executable instruction control module 130 may transmit authorization configuration 118 across wireless network 110 to wireless device 102. In another aspect, authorization configuration 118 may be forwarded through a static or serial connection to wireless device 102, or may be preloaded on wireless device 102 during the manufacture of the wireless device 102.

Further, method 368 may include receiving, at step 374, log 120 from wireless device 102. For example, embodiments include executable instruction control module 130 receiving log 120 generated at step 354 of the method 348 embodied in FIG. 9. In another aspect, log 120 may be received whole, or in pieces and assembled by executable instruction control module 130. In one aspect, executable instruction control module 130 may receive log 120 over wireless network 110, whereas another aspect may have the executable instruction control module 130 receive log 120 through a static or serial connection to the wireless device 102, or from some other computer device or storage media in communication with user manager 130 and wireless device 102.

Further, this aspect of method 368 may include analyzing, at step 376, log information 120, and generating, at step 378, an authorization report 154 based upon that analysis. At step 378 the user manager module may transmit the report 154 to a user, such as operator 108 for further analysis and action. Log analysis may be performed by analyzer 142 and may be based upon a authorization schema similar to the authorization schema 194 disclosed as part of authorization configuration 118. Report 154 may include any form of output that represents analysis of log 120 and other information contained in the information repository 136, as well as any other associated information such as reports of viruses, proper executable instruction versions for the wireless device 102, shut-down times for improper executable instruction versions, etc.

Although executable instruction control module 130 may generate report 154, module 130 and its corresponding components may be operable to present a ready view of executable instruction authorization related information collected from the wireless devices 102 in any form, such as tables, maps, graphics views, plain text, interactive programs or web pages, or any other display or presentation of the data. For example, executable instruction control module 130 may present executable instruction authorization related information on a monitor or display device, and/or may transmit this information, such as via electronic mail, to another computer device for further analysis or review through such mechanisms as through a standard HTTP, HTTPS, an FTP, or some other data transfer protocol.

The executable instruction control module 130 may be operable to change the authorization configuration 118 on the wireless device 102 and/or send a control command 126 to be executed on the respective wireless device 102 based upon the results of analyzer 140 without further analysis or authorization by an operator 108. Alternatively, the user manager 130 may be configured so as not to take independent action on any executable instructions determined to be unauthorized without approval from another source, such as that provided by an approved operator 108.

In one aspect, at step 380, the method includes providing access to the report. For example, executable instruction control module 130 may transmit report 154 to computer device 106 for review by operator 108. Based on report 154, operator 108 may execute an action, such as sending a control command 126 to the executable instruction control module 130 to delete or otherwise disable the executable instructions 124 on the wireless device 102.

Optionally, at step 382 the method may include receiving, processing, and logging the control command 126, before forwarding the command to the respective wireless device 102.

Optionally, step 380 may include verifying a control command 126, such as that received from operator 108 and executable on a wireless device to delete executable instructions 124. User manager control module 146 may execute permission logic 264 to make permission decision 152 as to whether or not to transmit control command 126 to the respective wireless device 102.

Alternatively, the operator 108, under control of operator control module 298 and communications module 214, may transmit the control command 126 directly to the wireless device 102, thereby minimizing message traffic between network components.

As deletion of executable instructions may be permanent, the user manger module 130 may, at step 384, receive a request for verification/authorization of command 126 from the wireless device prior to the execution of control command 126. Based upon permission logic 264, plurality of control permission 268, plurality of user ID 270, and plurality of wireless devices ID 272, the unit manager module 130 may, at step 386, transmit a verification/authorization message to the wireless device 102.

Thus, the described aspects allow a party, such as a wireless network service provider and a wireless device manufacturer, to maintain the presence or operability of authorized executable instructions on a wireless device.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure shows illustrative aspects and/or aspects, it should be noted that various changes and modifications could be made herein without departing from the scope of the described aspects and/or aspects as defined by the appended claims. Furthermore, although elements of the described aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A wireless communication device, comprising:
    a memory comprising executable instructions, a device type corresponding to wireless device, and an authorization configuration having an authorization schema that identifies at least one of authorized executable instructions and unauthorized executable instructions, wherein the authorization schema determines if the executable instructions are authorized or unauthorized based on the device type; and
    an executable instruction authorization module resident in the memory, the executable instruction authorization module comprising authorization logic operable to scan the memory and generate a log based upon the authorization configuration, the log comprising an identification of the executable instructions determined to be unauthorized based upon the authorization schema.

2. The device of claim 1, wherein the executable instructions comprises at least one of applications files and data files.

3. The device of claim 1, wherein the authorization configuration is received by the wireless device from across a wireless network.

4. The device of claim 1, wherein the authorization schema comprises a predetermined test and a predetermined result, and wherein the executable instruction authorization module is operable to execute the predetermined test to generate a test result, and further operable to compare the predetermined result to the generated test result to determine an authorization of the executable instructions.

5. The device of claim 4, wherein the authorization schema comprises at least one of a redundancy check, a test for a predetermined value at a predetermined location within the executable instructions, a check of signature information, and a test for a predetermined result of applying a predetermined function to at least a portion of the executable instructions.

6. The device of claim 1, wherein the executable instruction authorization module is operable to transmit the generated log to another device to determine whether or not the executable instructions are authorized.

7. The device of claim 6, wherein the executable instruction authorization module is operable to transmit the generated log across a wireless network.

8. The device of claim 1, wherein the generated log comprises at least one of an application name, an application version, an application creation date/time stamp, an application creator, a data file version, a data file size, and a data file creation date/time stamp.

9. The device of claim 1, wherein the authorization configuration comprises an action parameter that identifies an action to take when a predetermined unauthorized executable instruction is discovered by the authorization logic.

10. The device of claim 1, wherein the authorization configuration further comprises at least one of a tracking parameter selected from a plurality of tracking parameters and a reporting parameter selected from a plurality of reporting parameters, wherein the tracking parameter identifies when to scan the executable instructions, and wherein the reporting parameter identifies when to transmit the log across a wireless network.

11. The device of claim 1, wherein the executable instruction authorization module is further operable to establish a limited-access communications channel across the wireless network, wherein the limited-access communications channel is based on a predefined limited service configuration.

12. The device of claim 11, wherein the limited-access communications channel is not available to an end user of the device.

13. The device of claim 1, further comprising a device control module operable to execute a control command to change a status of the executable instructions.

14. The device of claim 13, wherein the device control module is operable to receive the control command from across a wireless network.

15. The device of claim 13, wherein the control command comprises at least one of a disable command, a delete command, and a restore command, wherein the disable command makes the executable instructions non-operable, wherein the restore command makes disabled executable instructions operational, and wherein the delete command effectively removes the executable instructions from the wireless device.

16. The device of claim 13, wherein the device control module is operable to verify an intent to execute the control command before executing the control command.

17. The device of claim 13, wherein the control command comprises a user identification and a control activity, and wherein the device control module further comprises permission logic operable to determine an authorization for executing the control command based on at least one of the user identification and the control activity.

18. The device of claim 13, wherein the log comprises an action record of executed control commands.

19. The device of claim 1, wherein the executable instruction authorization module is operable to monitor wireless device resource utilization of the executable instructions based upon the authorization schema.

20. An apparatus for managing executable instructions on a wireless device, comprising:
a configuration generator operable to generate and transmit an authorization configuration for receipt by a wireless device, the authorization configuration comprising an authorization schema that identifies at least one of authorized executable instructions and unauthorized executable instructions, wherein the authorization schema determines if the executable instructions are authorized or unauthorized based upon a device type associated with the wireless device;
an information repository operable to receive and store a log, the log comprising unauthorized executable instructions on the wireless device based on the authorization configuration; and
an executable instruction control module comprising an analyzer operable to generate an authorization report based on the log.

21. The apparatus of claim 20, wherein the analyzer further comprises a predetermined authorization test and a predetermined authorization result, wherein the log comprises an authorization test result generated by the wireless device, and wherein the analyzer is operable to compare the generated authorization test result to the predetermined authorization result to generate the authorization report.

22. The apparatus of claim 20, wherein the authorization schema comprises a predetermined authorization result selected for the wireless device.

23. The apparatus of claim 22, wherein the authorization schema comprises at least one of an application name, an application version, an application creation date/time stamp, an application creator, a data file version, a data file size, and a data file creation date/time stamp.

24. The apparatus of claim 20, wherein the executable instruction control module is operable to transmit at least a portion of the authorization report across a wireless network for analysis.

25. The apparatus of claim 24 further comprising a user manager module is operable to select the authorization schema from a plurality of authorization schemas and operable to transmit the authorization configuration across a wireless network.

26. The apparatus of claim 20, wherein the executable instruction control module is operable to allow an authorized user to access the authorization report.

27. The apparatus of claim 20, further comprising a device control module operable to send a control command to change an operational characteristic of executable instructions on the wireless device.

28. The apparatus of claim 27, wherein the device control module further comprises permission logic operable to verify an intent to execute the control command before sending the control command.

29. The apparatus of claim 27, wherein the control command comprises a user identification and a control activity, and wherein the device control module further comprises permission logic operable to determine an authorization for executing the control command before sending the control command, the authorization based, on at least one of the user identification and the control activity.

30. The apparatus of claim 27, wherein the device control module is operable to receive the control command from another computer device.

31. The apparatus of claim 30, wherein the other computer device is located across a wireless network.

32. The apparatus of claim 20, wherein the authorization configuration further comprises at least one of a tracking parameter selected from a plurality of tracking parameters, a reporting parameter selected from a plurality of reporting parameters, and an action parameter selected from a plurality of action parameters, wherein the tracking parameter dictates when to apply the authorization schema to executable instructions on the wireless device, wherein the reporting parameter identifies when to transmit the log across a wireless network, and wherein the action parameter identifies an action to take when a predetermined unauthorized executable instruction is discovered.

33. The apparatus of claim 32, wherein the tracking parameter identifies when to scan wireless device resources and correlate resource activity with application operation.

34. A method of managing executable instructions on a wireless device, comprising:
    generating an authorization configuration executable to initiate scanning and logging of executable instructions resident on a wireless device, the authorization configuration comprising an authorization schema that identifies at least one of authorized executable instructions and unauthorized executable instructions, wherein the authorization schema determines if the executable instructions are authorized or unauthorized based upon a device type associated with the wireless device;
    forwarding the authorization configuration for receipt by the wireless device;
    receiving a generated log from the wireless device based on the authorization configuration; and
    generating an authorization report based on the received log.

35. The method of claim 34, further comprising transmitting at least a portion of the authorization report to another computer device.

36. The method of claim 34, further comprising sending a control command to the wireless device, where the control command is based on the authorization report and is operable to initiate an action selected from the group consisting of a delete, a disable and a restore of executable instructions on the wireless device.

37. The method of claim 36, further comprising verifying the control command before sending the control command to the wireless device.

38. The method of claim 36, further comprising determining whether or not the control command is authorized.

39. The method of claim 38, where the control command comprises a user identification and a control activity, and where determining whether or not the control command is authorized further comprises comparing at least one of the user identification and the control activity with a plurality of control permissions correlated with a plurality of user identifications.

40. The method of claim 34, further comprising selecting the authorization schema from a plurality of authorization schemas based on at least one of a type of the wireless device, an identity of a network service provider associated with the wireless device, and a type of the executable instructions.

41. A method of managing executable instructions on a wireless device, comprising:
    obtaining an authorization configuration comprising an authorization schema that identifies at least one of authorized executable instructions and unauthorized executable instructions, wherein the authorization schema determines if the executable instructions are authorized or unauthorized based upon a device type associated with the wireless device;
    scanning executable instructions based upon the authorization configuration;
    logging at least portions of the scanned executable instructions into a log based upon the authorization schema; and
    forwarding the log to another device to determine a disposition of the logged executable instructions.

42. The method of claim 41, further comprising analyzing the scanned executable instructions based on a authorization schema, wherein the authorization schema includes at least one of a redundancy check, a test for a predetermined value at a predetermined location within the scanned executable instructions, a check of signature information, and a test for a predetermined result of applying a predetermined function to at least a portion of the scanned executable instructions.

43. The method of claim 41, wherein the authorization schema is selected from a plurality of authorization schemas based on at least one of a type of the wireless device, an identity of a network service provider associated with the wireless device, and a type of the executable instructions.

44. The method of claim 41, wherein receiving the authorization configuration further comprises receiving at least one of a tracking parameter selected from a plurality of tracking parameters, a reporting parameter selected from a plurality of reporting parameters, and an action parameter selected from a plurality of action parameters.

45. The method of claim 41, further comprising establishing a limited-access communications channel across a wireless network based on a predefined limited service configuration.

46. The method of claim 41, further comprising receiving a control command, the control command dictation at least one of deleting executable instructions and disabling executable instructions, where the control command is based on the log.

47. A machine-readable medium comprising instructions which, when executed by a machine, cause the machine to perform operations comprising:
    obtaining an authorization configuration comprising an authorization schema that identifies at least one of authorized executable instructions and unauthorized executable instructions, wherein the authorization schema determines if the executable instructions are authorized or unauthorized based upon a device type associated with the wireless device;
    scanning executable instructions based upon the authorization configuration;
    logging at least portions of the scanned executable instructions into a log based upon the authorization schema; and
    forwarding the log to another device to determine a disposition of the logged executable instructions.

48. At least one processor configured to perform the actions of:
    obtaining an authorization configuration comprising an authorization schema that identifies at least one of authorized executable instructions and unauthorized executable instructions, wherein the authorization schema determines, if the executable instructions are authorized or unauthorized based upon a device type associated with the wireless device;
    scanning executable instructions based upon the authorization configuration;
    logging at least portions of the scanned executable instructions into a log based upon the authorization schema; and
    forwarding the log to another device to determine a disposition of the logged executable instructions.

49. A wireless device, comprising:

means for obtaining an authorization configuration comprising an authorization schema that identifies at least one of authorized executable instructions and unauthorized executable instructions, wherein the authorization schema determines if the executable instructions are authorized or unauthorized based upon a device type associated with the wireless device;

means for scanning executable instructions based upon the authorization configuration;

means for logging at least portions of the scanned executable instructions into a log based upon the authorization schema; and means for forwarding the log to another device to determine a disposition of the logged executable instructions.

50. A machine-readable medium comprising instructions which, when executed by a machine, cause the machine to perform operations comprising:

generating an authorization configuration executable to initiate scanning and logging of executable instructions resident on a wireless device, the authorization configuration comprising an authorization schema that identifies at least one of authorized executable instructions and unauthorized executable instructions, wherein the authorization schema determines if the executable instructions are authorized or unauthorized based upon a device type associated with the wireless device;

forwarding the authorization configuration for receipt by the wireless device;

receiving a generated log from the wireless device based on the authorization configuration; and generating an authorization report based on the received log.

51. At least one processor configured to perform the actions of:

generating an authorization configuration executable to initiate scanning and logging of executable instructions resident on a wireless device, the authorization configuration comprising an authorization schema that identifies at least one of authorized executable instructions and unauthorized executable instructions, wherein the authorization schema determines if the executable instructions are authorized or unauthorized based upon a device type associated with the wireless device;

forwarding the authorization configuration for receipt by the wireless device;

receiving a generated log from the wireless device based on the authorization configuration; and generating an authorization report based on the received log.

52. An apparatus, comprising:

means for generating an authorization configuration executable to initiate scanning and logging of executable instructions resident on a wireless device, the authorization configuration comprising an authorization schema that identifies at least one of authorized executable instructions and unauthorized executable instructions, wherein the authorization schema determines if the executable instructions are authorized or unauthorized based upon a device type associated with the wireless device;

means for forwarding the authorization configuration for receipt by the wireless device;

means for receiving a generated log from the wireless device based on the authorization configuration; and means for generating an authorization report based on the log.

* * * * *

UNITED STATES PATENT AND TRADEMARK OFFICE
CERTIFICATE OF CORRECTION

| | | |
|---|---|---|
| PATENT NO. | : 7,770,785 B2 | Page 1 of 1 |
| APPLICATION NO. | : 11/435049 | |
| DATED | : August 10, 2010 | |
| INVENTOR(S) | : Jha et al. | |

It is certified that error appears in the above-identified patent and that said Letters Patent is hereby corrected as shown below:

Column 20, line 57, claim 2: "comprises" to read as --comprise--

Column 21, line 33, claim 11: "the wireless network," to read as --a wireless network,--

Column 22, line 59, claim 29: "based, on" to read as --based on--

Column 24, line 7, claim 42: "a authorization schema," to read as --the authorization schema,--

Column 24, line 43, claim 47: "the wireless device;" to read as --a wireless device;--

Column 24, line 60, claim 48: "the wireless device;" to read as --a wireless device;--

Signed and Sealed this
Twelfth Day of July, 2011

David J. Kappos
*Director of the United States Patent and Trademark Office*